United States Patent
Nakagawa

(10) Patent No.: US 12,213,068 B2
(45) Date of Patent: Jan. 28, 2025

(54) COMMUNICATION APPARATUS, METHOD FOR CONTROLLING THE SAME, AND RECORDING MEDIUM

(71) Applicant: CANON KABUSHIKI KAISHA, Tokyo (JP)

(72) Inventor: Toshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 17/544,741

(22) Filed: Dec. 7, 2021

(65) Prior Publication Data

US 2022/0095219 A1 Mar. 24, 2022

Related U.S. Application Data

(63) Continuation of application No. PCT/JP2020/021317, filed on May 29, 2020.

(30) Foreign Application Priority Data

Jun. 12, 2019 (JP) .................................. 2019-109376

(51) Int. Cl.
*H04W 48/20* (2009.01)
*H04W 48/04* (2009.01)
*H04W 48/14* (2009.01)
*H04W 88/10* (2009.01)
*H04W 88/12* (2009.01)

(52) U.S. Cl.
CPC ........... *H04W 48/20* (2013.01); *H04W 48/04* (2013.01); *H04W 48/14* (2013.01); *H04W 88/10* (2013.01); *H04W 88/12* (2013.01)

(58) Field of Classification Search
CPC ..... H04W 48/20; H04W 48/04; H04W 48/14; H04W 88/10; H04W 88/12
See application file for complete search history.

(56) References Cited

U.S. PATENT DOCUMENTS 10,542,486 B1 * 1/2020 Strater .................. H04W 84/20
2014/0273939 A1 9/2014 Hyde et al.
(Continued)

FOREIGN PATENT DOCUMENTS

| CN | 1602606 A | 3/2005 |
|----|-----------|--------|
| CN | 101513100 A | 8/2009 |
| CN | 101568190 A | 10/2009 |

(Continued)

OTHER PUBLICATIONS

The Broadband Forum, "CPE WAN Management Protocol", Technical Report TR-069, Issue 1, Amendment 6 (Year: 2018).*

*Primary Examiner* — Joseph A Bednash
(74) *Attorney, Agent, or Firm* — Canon U.S.A., Inc., IP Division

(57) ABSTRACT

In a network including a plurality of access points, a communication apparatus performs communication via the network as a first access point based on setting information for enabling the communication apparatus to operate as the first access point that controls another access point, backs up the setting information to an apparatus other than the communication apparatus, and notifies the another access point of location information indicating the location of the apparatus other than the communication apparatus where the setting information is backed up.

5 Claims, 10 Drawing Sheets

(56) References Cited

U.S. PATENT DOCUMENTS

| | | | | |
|---|---|---|---|---|
| 2017/0103006 A1* | 4/2017 | Ambat | ................ | G06F 11/2074 |
| 2019/0273651 A1* | 9/2019 | Boucadair | ........... | H04L 41/0672 |

FOREIGN PATENT DOCUMENTS

| | | |
|---|---|---|
| CN | 101960908 A | 1/2011 |
| CN | 104052893 A | 9/2014 |
| CN | 106982457 A | 7/2017 |
| CN | 108471482 A | 8/2018 |
| CN | 108702701 A | 10/2018 |
| JP | 2003348662 A | 12/2003 |
| JP | 2006050587 A | 2/2006 |
| JP | 2007049522 A | 2/2007 |
| JP | WO2010010708 A1 | 1/2012 |
| JP | 2014183377 A | 9/2014 |
| JP | 2017513376 A | 5/2017 |
| JP | 2017152766 A | 8/2017 |
| JP | 2017536044 A | 11/2017 |
| JP | 2018078527 A | 5/2018 |

* cited by examiner

COMMUNICATION APPARATUS, METHOD FOR CONTROLLING THE SAME, AND RECORDING MEDIUM

CROSS-REFERENCE TO RELATED APPLICATIONS

This application is a Continuation of International Patent Application No. PCT/JP2020/021317, filed May 29, 2020, which claims the benefit of Japanese Patent Application No. 2019-109376, filed Jun. 12, 2019, both of which are hereby incorporated by reference herein in their entirety.

BACKGROUND OF THE INVENTION

Field of the Invention

The present invention relates to a communication apparatus capable of operating as an access point of a wireless network.

Background Art

The Wi-Fi EasyMesh® standard formulated by Wi-Fi Alliance prescribes various controls in a network including a plurality of access points (hereinafter also referred to as "APs"). Such a network including a plurality of APs is referred to as a "multi-AP network".

According to the Wi-Fi EasyMesh standard, an AP configuring a multi-AP network is able to acquire various information from other APs to implement an efficient network control between the plurality of APs by using the information.

Each AP configuring a multi-AP network operates as either a Multi-AP Controller (hereinafter referred to as a "controller") or a Multi-AP Agent (hereinafter referred to as an "agent") (Patent Document 1).

The controller is an AP that controls other APs to control the entire multi-AP network. The agent is an AP that notifies the controller of various kinds of network information under the control of the controller.

The controller controls the multi-AP network based on the network information notified from the agent.

The Wi-Fi EasyMesh standard prescribes that only one controller constantly exists in the multi-AP network. Therefore, in the event that a failure or trouble occurs in the AP serving as a controller, controller setting information for enabling the AP to operate as a controller cannot be transferred to another AP in the multi-AP network.

Likewise, even when another AP is selected as a new controller after power of the AP serving as a controller is turned OFF or after the AP serving as a controller leaves the multi-AP network, the controller setting information cannot be transferred to the another AP.

In such a case, since the controller setting information cannot be transferred to the another AP, the user needs to set the controller setting information to the AP that will serve as a new controller, resulting in complicated user operations.

When the controller setting information set in the controller as a single controller on the multi-AP network is to be transferred to another AP in advance, the AP to be a new controller in place of the current controller is not normally determined. Although only one AP is to be a new controller, the controller setting information needs to be shared between all of the other APs in advance, wasting wireless communication resources.

CITATION LIST

Patent Literature

PTL 1: Japanese Patent Laid-Open No. 2017-0513376

SUMMARY OF THE INVENTION

The present invention is directed to enhancing convenience in transferring the setting information for controlling another access point, to the another access point in a wireless network including a plurality of access points.

In order to solve the above-described issue, according to an aspect of the present invention, a communication apparatus includes a communication unit configured to, in a network including a plurality of access points, perform communication via the network as a first access point based on setting information for enabling the communication apparatus to operate as the first access point that controls another access point, a backup unit configured to back up the setting information to another apparatus, and a notification unit configured to notify the another access point of location information indicating a location of the another apparatus where the setting information is backed up by the backup unit.

Further features of the present invention will become apparent from the following description of exemplary embodiments with reference to the attached drawings.

DESCRIPTION OF THE EMBODIMENTS

Exemplary embodiments for embodying the present invention will be described in detail below with reference to the attached drawings. The following exemplary embodiments are to be considered as examples for implementing the present invention and are to be appropriately modified or changed depending on individual constructions of apparatuses to which the present invention is applied and various conditions. The present invention is in no way limited to the following exemplary embodiments. Not all of the combinations of the features described in the exemplary embodiments are indispensable to the solutions for the present invention.

Although, in the example to be described below, a communication apparatus conforms to the Wi-Fi EasyMesh standard that permits a multi-access point (AP) network, the exemplary embodiments are not limited thereto. For example, the communication apparatus may use other communication methods that enable wireless communication in a multi-AP network as a wireless network including a plurality of access points (APs).

First Exemplary Embodiment

<Network Configuration According to First Exemplary Embodiment>

Figure 1:
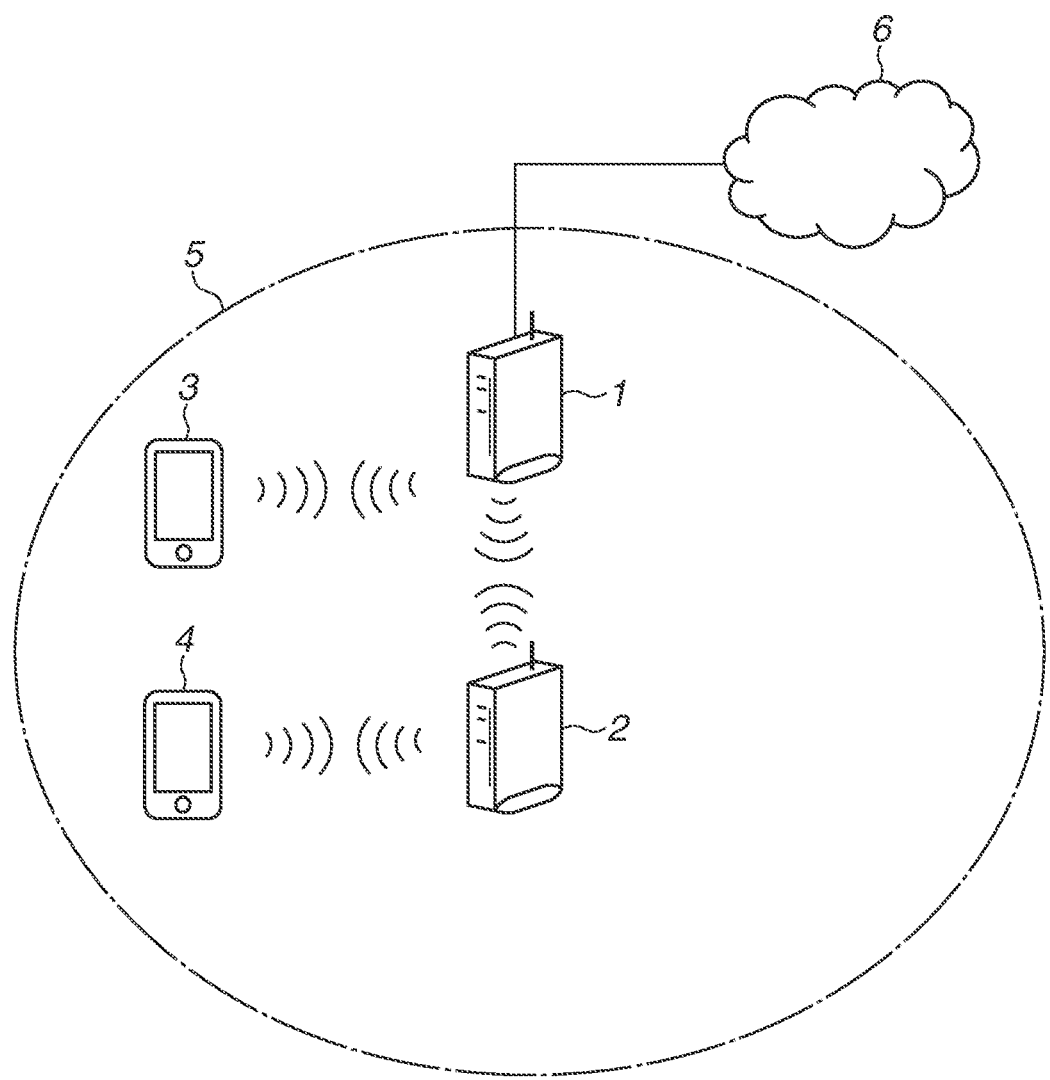
FIG. 1 illustrates an example of a network configuration of a communication system according to a first exemplary embodiment.

FIG. 1 illustrates an example of a network configuration of a communication system according to the present exemplary embodiment.

The communication system illustrated in FIG. 1 includes communication apparatuses 1 to 4 connected to a multi-AP network 5 as a network including at least one AP, and implements wireless communication on the multi-AP network 5.

The communication apparatuses 1 and 2 each operate as an access point (AP) that builds a wireless Local Area Network (LAN) conforming to the Institute of Electrical and Electronics Engineers (IEEE) 802.11 series standard. Hereinafter, the communication apparatuses 1 and 2 are referred to as "AP 1" and "AP 2", respectively. On the other hand, the communication apparatuses 3 and 4 each operate as a station that connects to the wireless LAN built by the communication apparatuses 1 and 2, respectively. Hereinafter, the communication apparatuses 3 and 4 are referred to as "STAs".

Referring to FIG. 1, the communication apparatus 1 is connected to a wide area network (WAN) 6 and operates as a gateway that relays communication of the other communication apparatuses 2 to 4 for connection to the WAN 6. The communication apparatus 2 may operate as a gateway in place of the communication apparatus 1. The wireless communication apparatuses 1 and 2 may be able to perform wire communication in addition to or instead of wireless communication.

According to the present exemplary embodiment, either one of the communication apparatuses 1 and 2 as APs serves as a controller. The controller has the function of controlling the other AP in the multi-AP network 5 to control the entire multi-AP network 5.

On the other hand, the other of the communication apparatuses 1 and 2 as APs that does not serve as a controller but serves as an agent. The agent has the function of informing the controller of network information under the control of the controller.

For example, the controller transmits a predetermined control message to the agent to control the connection channel and transmission power of the agent. The controller further transfers the agent to a different Basic Service Set (BSS) under a different AP, controls steering such as STA roaming, controls data traffic, and performs network diagnosis.

The network information notified from the agent to the controller includes capability information about the agent itself and capability information about STAs and APs connected to the agent. The capability information may be High Throughput (HT) capability or Very High Throughput (VHT) capability conforming to the IEEE 802.11 series standard. An AP connected to the agent specifically refers to an AP that connected to the agent by performing the STA function in a device in the multi-AP network, called a Backhaul STA.

The network information notified from the agent to the controller may further include information about wireless LAN connection channels, information about wave interference, STA link information (notification of link connection and disconnection), and information for notifying of a change of the network topology. The network information may further include metrics information about Beacon frames.

The AP serving as a controller may have the function of an agent at the same time. Although the present exemplary embodiment will be described below on the premise that both the communication apparatuses 1 and 2 illustrated in FIG. 1 are provided with the functions of both a controller and an agent, the apparatuses may be provided with the function of either one of a controller and an agent.

The Wi-Fi EasyMesh standard prescribes that one multi-AP network includes only one controller and permits a plurality of agents. Therefore, the present exemplary embodiment will be described below on the premise that either one of the communication apparatuses 1 and 2 (APs 1 and 2, respectively) in FIG. 1 operates as a controller and the other AP operates as an agent.

The communication apparatuses 1 and 2 illustrated in FIG. 1 are capable of operating as an AP conforming to the Wi-Fi EasyMesh standard, and may be an apparatus having the hardware and function configuration to be described below with reference to FIG. 2. Although the communication apparatuses 1 and 2 may be a device such as a wireless Local Area Network (LAN) router, personal computer (PC), tablet terminal, smart phone, television set, printer, copying machine, or projector, the present invention is not limited thereto. The communication apparatuses 1 and 2 may be devices different from each other.

<Hardware and Function Configuration of Communication Apparatus>

Figure 2:
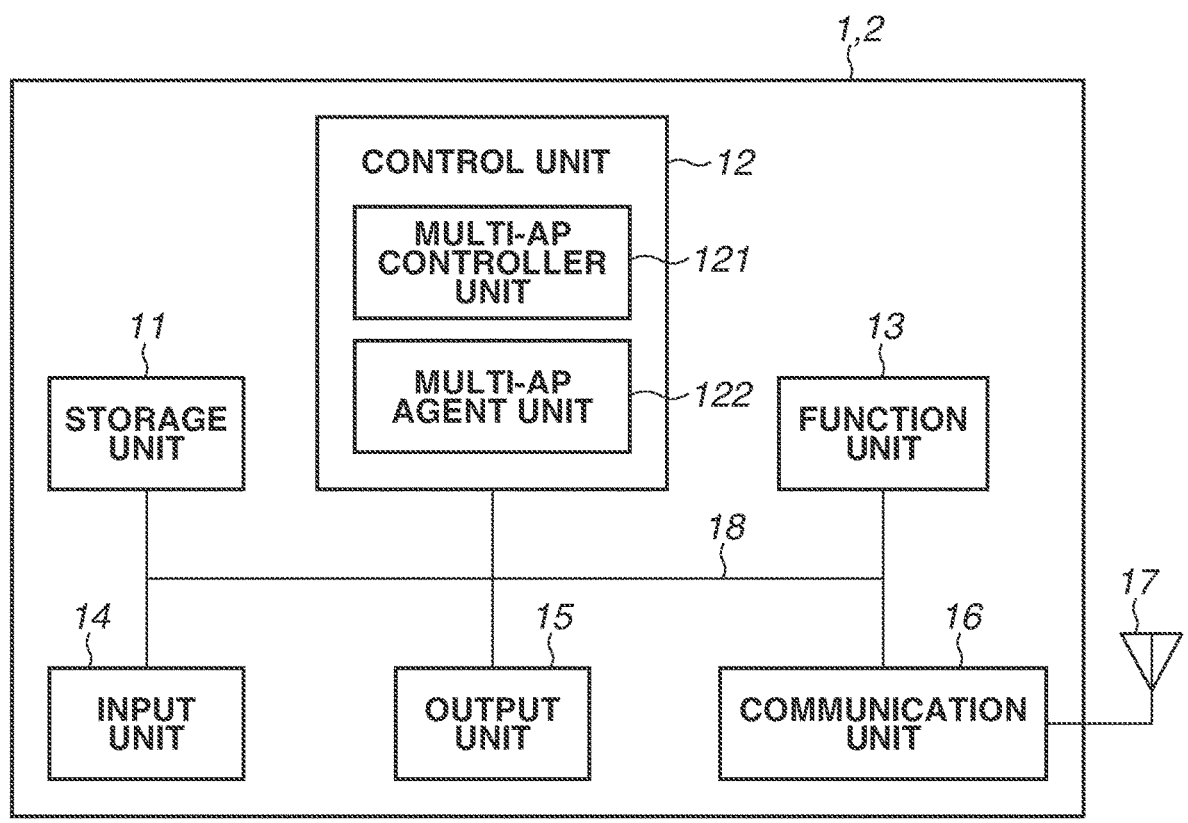
FIG. 2 is a block diagram illustrating an example of hardware and a function configuration of a communication apparatus according to the first exemplary embodiment.

FIG. 2 illustrates an example of hardware and a function configuration of a communication apparatus according to the present exemplary embodiment. The communication apparatus 1 in FIG. 1 will be described below as a communication apparatus having the hardware and function configuration illustrated in FIG. 2. The communication apparatus 2 also has the hardware and function configuration illustrated in FIG. 2.

The communication apparatus 1 in FIG. 2 includes a storage unit 11, a control unit 12, a function unit 13, an input unit 14, an output unit 15, a communication unit 16, and an antenna 17.

These units of the communication apparatus 1 in FIG. 2 are interconnected by a system bus 18 to enable the units to communicate with each other. The communication apparatus 1 does not need to include all of the above-described modules, and may include additional modules in addition to the configuration in FIG. 2.

The storage unit 11 includes memories such as a read only memory (ROM) and a random access memory (RAM) to store programs for executing various operations to be described below and information such as communication parameters for wireless communication. Examples of storage media usable as the storage unit 11 include memories such as a ROM and a RAM, a flexible disk, hard disk, optical disk, compact disc read only memory (CD-ROM), compact disc recordable (CD-R), magnetic tape, nonvolatile memory card, and digital versatile disc (DVD). The storage unit 11 may include a plurality of memories.

The control unit 12 includes one or a plurality of processors such as a central processing unit (CPU) and a micro processing unit (MPU). The control unit 12 comprehensively controls the entire communication apparatus 1 by executing a program stored in the storage unit 11.

According to the present exemplary embodiment, the control unit 12 includes a multi-AP controller unit 121 and a multi-AP agent unit 122. The multi-AP controller unit 121 operates the communication apparatus 1 as a controller in the multi-AP network. The multi-AP agent unit 122 operates the communication apparatus 1 as an agent in the multi-AP network. The communication apparatus 1 performs the function of at least either one of the multi-AP controller unit 121 and the multi-AP agent unit 122 according to the setting and operation on the communication apparatus 1.

The control unit 12 can separately enables or disable the multi-AP controller unit 121 and the multi-AP agent unit 122.

More specifically, when the communication apparatus 1 serves as a controller and an agent at the same time, the control unit 12 enables the functions of both the multi-AP controller unit 121 and the multi-AP agent unit 122. On the other hand, when the communication apparatus 1 serves only as a controller, i.e., does not serve as an agent, the control unit 12 enables the function of the multi-AP controller unit 121 and disables the function of the multi-AP agent unit 122. In contrast, when the communication apparatus 1 serves only as an agent, i.e., does not serve as a controller, the control unit 12 disables the function of the multi-AP controller unit 121 and enables the function of the multi-AP agent unit 122.

By using the function of the multi-AP controller unit 121, the communication apparatus 1 issues an instruction to the agent based on the topology information and discovery information about the network received from the agent, thus controlling the multi-AP network 5.

The topology information may be, for example, the Topology Notification message or the Topology Response message prescribed by the IEEE 1905.1 standard. The discovery information may be, for example, the AP-Autoconfiguration Search message or the AP-Autoconfiguration Response message prescribed by the IEEE 1905.1 standard. All of these messages conform to the specifications of the Wi-Fi EasyMesh standard.

Based on the topology information and the discovery information, the controller transmits a Client Association Control Request message as a multi-AP control message prescribed by the specifications of the Wi-Fi EasyMesh standard. This prevents an STA from connecting to other BSS's in the multi-AP network 5 and subjects the STA to explicit steering (roaming) to a predetermined BSS to enable efficient STA steering between BSS's.

When the communication apparatus 1 does not serve as a controller, the communication apparatus 1 does not need to include the multi-AP controller unit 121. Likewise, when the communication apparatus 1 does not serve as an agent, the communication apparatus 1 does not need to include the multi-AP agent unit 122.

The control unit 12 may control the entire communication apparatus 1 through the collaboration between a program stored in the storage unit 11 and an operating system (OS). The control unit 12 may include a plurality of processors such as a multi-core to control the entire communication apparatus 1 by using a plurality of processors.

The function unit 13 performs predetermined processing such as printing and projection under the control of control unit 12. The function unit 13 may include hardware that enables the communication apparatus 1 to perform predetermined processing. For example, when the communication apparatus 1 is a printer, the function unit 13 is a printing unit that performs print processing. In this case, data stored in the storage unit 11 or data transmitted from other communication apparatuses via the communication unit 16 to be described below may be subjected to the print processing performed by the function unit 13.

The input unit 14 receives various operations from the user via a pointing device such as a mouse, audio input, and button operation.

The output unit 15 outputs various kinds of information to the user. For example, the output of the output unit 15 may include at least one of display on a light emitting diode (LED), display on a screen, audio output from a speaker, and vibration output. Alternatively, the input unit 14 and the output unit 15 may be implemented as one module, like a touch panel.

The communication unit 16 controls a wireless LAN conforming to the IEEE 802.11 series standard as the protocol of the data link layer, and controls wired communication based on a wired LAN or the like conforming to the IEEE 802.3 standard. The communication unit 16 further controls Internet Protocol (IP) communication of the communication protocol of the network layer.

According to the present exemplary embodiment, the communication unit 16 performs the protocol conforming to the IEEE 1905.1 standard on the communication conforming to the IEEE 802.11 and the IEEE 802.3 standards. The communication unit 16 further controls a controller and/or an agent in conformance with the Wi-Fi EasyMesh standard. The IEEE 1905.1 standard prescribes the protocol to be located in the hierarchy between the data link layer and the network layer.

However, communication methods that can be used by the communication unit 16 are not limited thereto. For example, the configuration of the present exemplary embodiment is applicable to communication apparatuses conforming to wireless communication methods such as Bluetooth®, Near Field Communication (NFC), Ultra Wide Band (UWB), ZigBee, and Multi Band OFDM Alliance (MBOA), and to communication apparatuses conforming to wired communication methods. UWB includes wireless universal serial bus (USB), wireless 1394, and WINET.

The communication unit 16 controls the antenna 17 to perform transmission and reception of wireless communication signals for wireless communication.

<Processing Performed by Communication Apparatus Operating as Controller>

Figure 3:
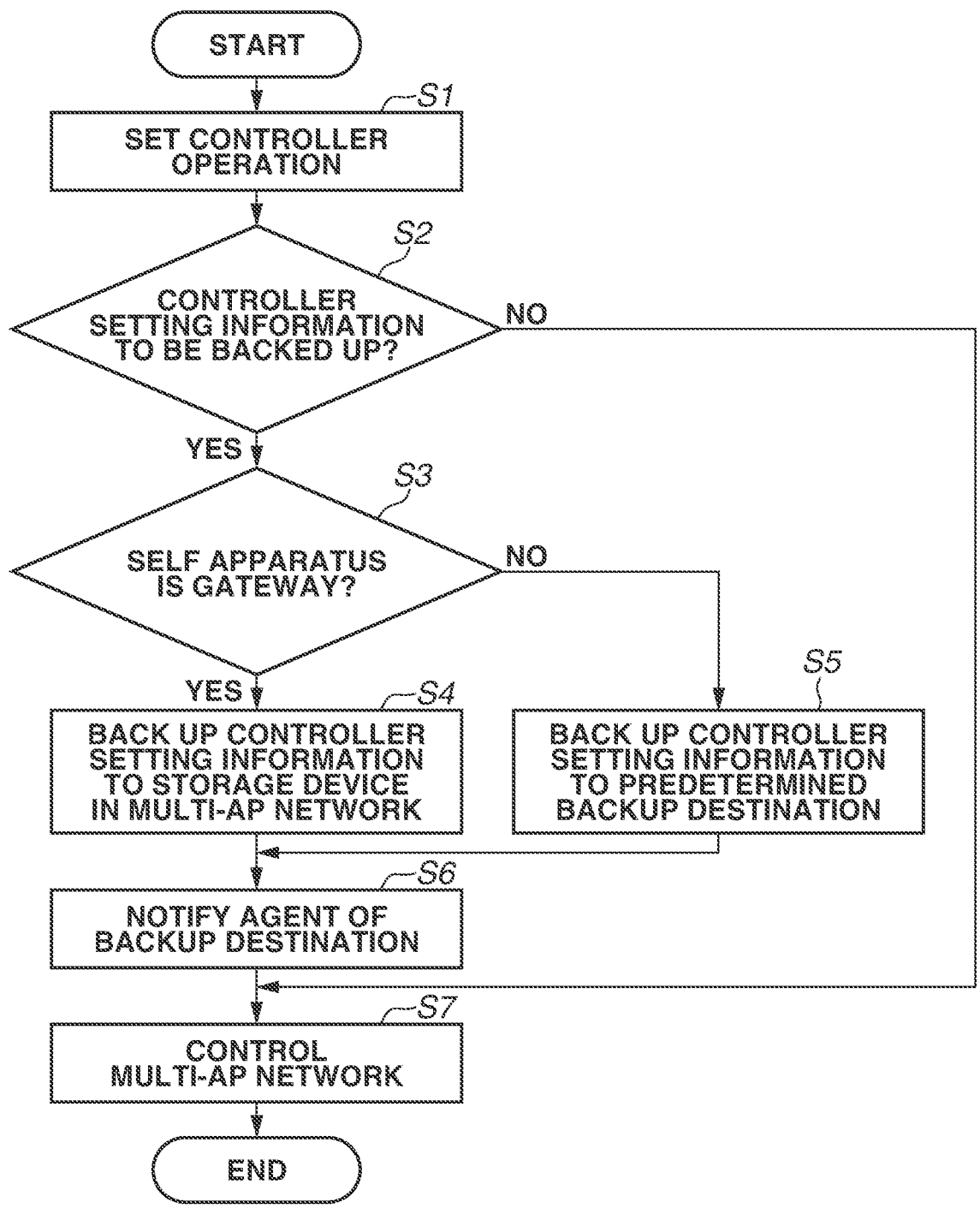
FIG. 3 is a flowchart illustrating an example of processing performed in a case where the communication apparatus according to the first exemplary embodiment operates as a controller of a multi-access point (AP) network.

FIG. 3 is a flowchart illustrating an example of processing for backing up the controller setting information performed in a case where the communication apparatus operates as a controller in the multi-AP network 5. The following description will be made on the premise that the communication apparatus 1 in FIG. 1 operates as a controller for convenience, the communication apparatus 2 may perform the processing illustrated in FIG. 3 as a controller in place of the communication apparatus 1.

Each step in FIG. 3 is implemented when the control unit 12 reads a program stored in the storage unit 11 of the communication apparatus 1 and then executes the program. At least a part of the flowchart illustrated in FIG. 3 may be implemented by hardware. When implementing a part of the flowchart by hardware, it is necessary to automatically generate a dedicated circuit on a Field Programmable Gate Array (FPGA) from a program for implementing each step, by using a predetermined compiler. A part of the flowchart may also be implemented by a Gate Array circuit as hardware formed in a similar way to the FPGA. A part the flowchart may also be implemented by an Application Specific Integrated Circuit (ASIC).

In step S1, the multi-AP controller unit 121 of the communication apparatus 1 performs setting (referred to as "controller setting") for enabling the communication apparatus 1 to operate as a controller in the multi-AP network 5. Information to be set to enable the communication apparatus 1 to operate as a controller is referred to as controller setting information.

Examples of specific controller setting methods include a method for setting information input by the user via the input unit 14 and a method for reading the controller setting information prestored in the storage unit 11. Other examples of specific controller setting methods include a method for automatically making settings for controlling the entire multi-AP network 5, such as settings of a connection channel and transmission power of each agent based on the network information acquired from the agent via the communication unit 16.

The controller setting information includes at least one of a Service Set Identifier (SSID), channel setting, a password and certificate for authentication, agent management information, network topology information, and discovery information.

In step S2, the multi-AP controller unit 121 of the communication apparatus 1 determines whether to back up the controller setting information set in step S1. More specifically, the multi-AP controller unit 121 may determine whether to back up the controller setting information, for example, by determining whether the controller setting is completed. When the controller setting in step S1 is completed, the multi-AP controller unit 121 may determine to back up the controller setting information. However, the determination method is not limited thereto. The multi-AP controller unit 121 may determine whether to back up the controller setting information by determining whether at least a part of the controller settings has been changed or whether a predetermined period time has elapsed. Alternatively, the multi-AP controller unit 121 may determine to back up the controller setting information when the communication apparatus 1 stops operating as a controller, i.e., when deactivating device operations, when changing the role of the communication apparatus 1 to an agent, or when leaving the multi-AP network 5.

When the multi-AP controller unit 121 determines not to back up the controller setting information (NO in step S2), the processing proceeds to S7. In this case, the multi-AP controller unit 121 of the communication apparatus 1 skips steps S3 to S6 to omit the processing for backing up the controller setting information.

In step S7, the multi-AP controller unit 121 of the communication apparatus 1 controls the multi-AP network 5 based on the controller setting information set in step S1.

On the other hand, when the multi-AP controller unit 121 determines to back up the controller setting information (YES in step S2), the processing proceeds to step S3. In step S3, the multi-AP controller unit 121 determines whether the self apparatus is a gateway. The multi-AP controller unit 121 can determine whether the self apparatus is a gateway by determining whether the self apparatus has a network address conversion function and a protocol conversion function for connecting the local network to the Internet or wide area network (WAN 5) as gateway functions, or by determining whether various settings for performing the protocol conversion function and the network address conversion function are made on the self apparatus.

When the self apparatus is determined to be a gateway (YES in step S3), the processing proceeds to step S4. In step S4, the multi-AP controller unit 121 of the communication apparatus 1 backs up the controller setting information set in step S1 to a storage device other than the communication apparatus 1 in the multi-AP network 5. The storage device as a backup destination of the controller setting information may be an apparatus having a storage device that is accessible from other agents participating in the multi-AP network 5 or other agents participating within the multi-AP network 5.

If the controller as a gateway fails, the agent that will serve as a new controller is unable to acquire the setting information from the outside of the multi-AP network 5 via the gateway. Therefore, when the communication apparatus 1 as a controller is a gateway, the communication apparatus 1 backs up the controller setting information to a storage device in the multi-AP network 5.

On the other hand, when the self apparatus is determined to be not a gateway (NO in step S3), the processing proceeds to step S5. In step S5, the multi-AP controller unit 121 of the communication apparatus 1 backs up the controller setting information to a predetermined backup destination. Unlike step S4, the backup destination in step S5 is not limited to storage devices and other agents in the multi-AP network 5. Since the agent that will serve as a new controller can access the outside of the multi-AP network 5 via a gateway, the backup destination in step S5 may be a cloud or an arbitrary storage device outside the multi-AP network 5. The backup destination may also be an apparatus specified in advance by the user.

In step S6, the multi-AP controller unit 121 of the communication apparatus 1 notifies other agents participating in the multi-AP network 5 of the location information about the backup destination where the controller setting information has been backed up in step S4 or S5. More specifically, for example, the method for notifying of the location information about the backup destination may use various control messages prescribed by the above-described IEEE 1905.1 standard. For example, the location information about the backup destination may be described in the type-length-value (TLV) format conforming to the IEEE 1905.1 standard and included in a control message. This method will be described in detail below with reference to FIG. 4.

In step S6, the agents as notification destinations of the location information about the backup destination of the controller setting information may be all or some of the agents participating in the multi-AP network 5. For example, if the agent that will serve as the next controller in place of the current controller is predetermined, the location information about the backup destination only needs to be notified to at least the predetermined agent.

In step S7, the multi-AP controller unit 121 of the communication apparatus 1 controls the multi-AP network 5 based on the controller setting information set in step S1 and ends the processing.

As a result of processing of the flowchart illustrated in FIG. 3, the communication apparatus 1 according to the present exemplary embodiment can back up the controller setting information required for the communication apparatus 1 to operate as a controller, and notify an agent of the location information about the backup destination.

Figure 4:
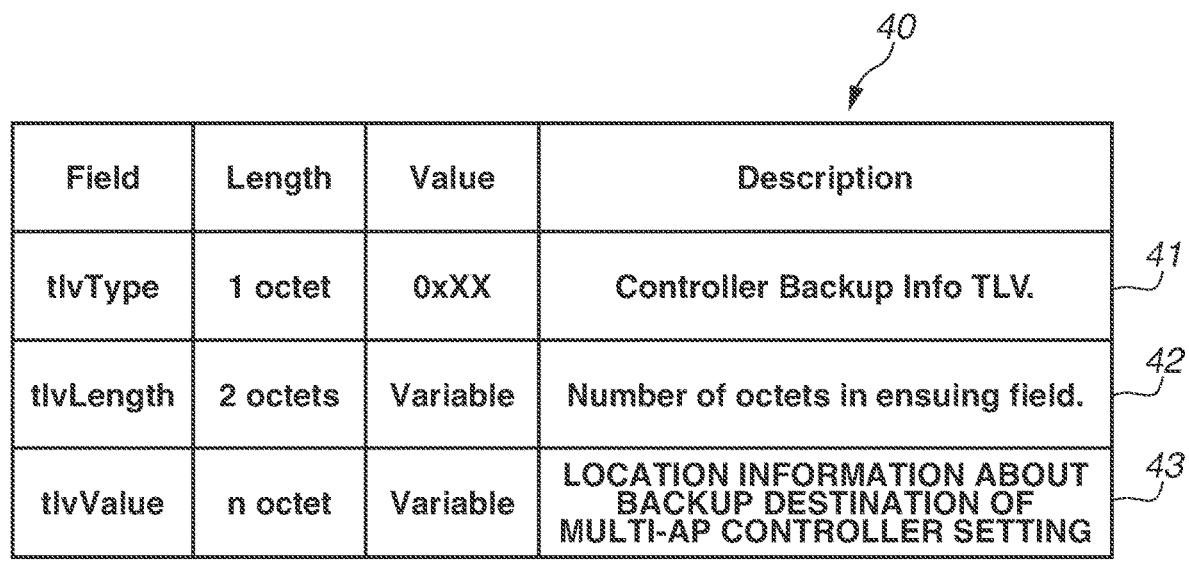
FIG. 4 illustrates an example of a message format to be used when the communication apparatus 1 provides a notification of information about a backup destination of controller setting information.

FIG. 4 illustrates an example of a format (Controller Backup Info TLV format) to be used when notifying of the location information about the backup destination where the controller setting information is to be backed up by the communication apparatus 1 according to the present exemplary embodiment. Referring to the example in FIG. 4, the backup destination of the controller setting information is described in the type-length-value (TLV) format 40 prescribed by the IEEE 1905.1 standard. The TLV format 40 in FIG. 4 includes three different fields: tlvType41, tlvLength42, and tlvValue43.

According to the present exemplary embodiment, as illustrated in FIG. 4, the length of each field is defined as 1 octet, 2 octets, and n octets. However, the TLV format 40 is not limited to the field and field length illustrated in FIG. 4. The location information about the backup destination of the controller setting information described in the TLV format 40 may be included in a control message prescribed by the IEEE 1905.1 standard notified from the controller to an agent in the multi-AP network 5.

Referring to FIG. 4, a predetermined value indicating that the message describes the location information about the backup destination of the controller setting information in the TLV format is set to the tlvType field 41. The value of the tlvType field 41 is specific for each format that is defined to identify the type of the TLV format of the multi-AP network. The present exemplary embodiment may use an arbitrary value not defined by the Wi-Fi EasyMesh standard.

A variable value indicating the number of octets in the following field is set to the tlvLength field 42. According to the present exemplary embodiment, the number of octets (2) for the following tlvValue field 43 is set to the tlvLength field 42.

The location information about the backup destination of the controller setting information is set to the tlvValue field 43. For example, the location information about the backup destination of the controller setting information may include character string information such as a Universal Resource Locator (URL), Internet Protocol (IP) address, Media Access Control (MAC) address, and file path. In addition to the location information, identification information about enabling other APs participating in the multi-AP network 5 to access the storage device as the backup destination of the controller setting information may be set to the tlvValue field 43.

In the configuration including the location information about the backup destination of the controller setting information, the value of each field value of the TVL format 40 is not limited to the above-described value but may be an arbitrary value. According to the present exemplary embodiment, various control messages prescribed by the IEEE 1905.1 standard are extended to include information about the location information about the backup destination of the controller setting information, and used to notify the agent of the location information about the backup destination of the controller setting information.

However, the method for notifying of the location information about the backup destination of the controller setting information is not limited to the above-described notification method using various control messages prescribed by the IEEE 1905.1 standard, but may be an arbitrary notification method.

<Processing of Communication Apparatus Operating as Agent>

Figure 5:
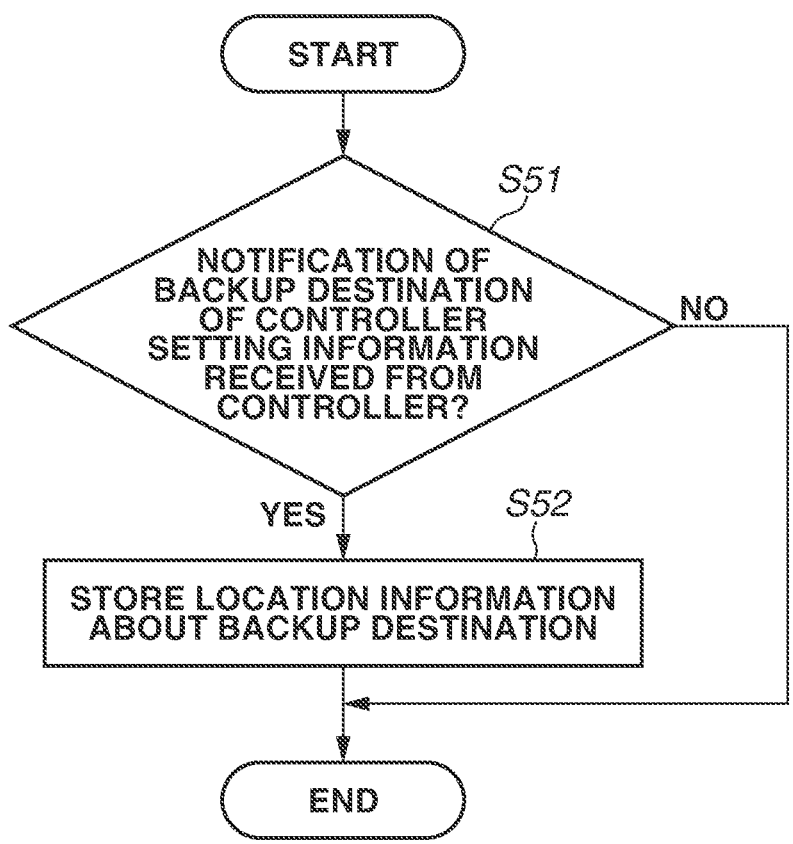
FIG. 5 is a flowchart illustrating an example of processing performed in a case where the communication apparatus according to the first exemplary embodiment operates as an agent of the multi-AP network.
Figure 6:
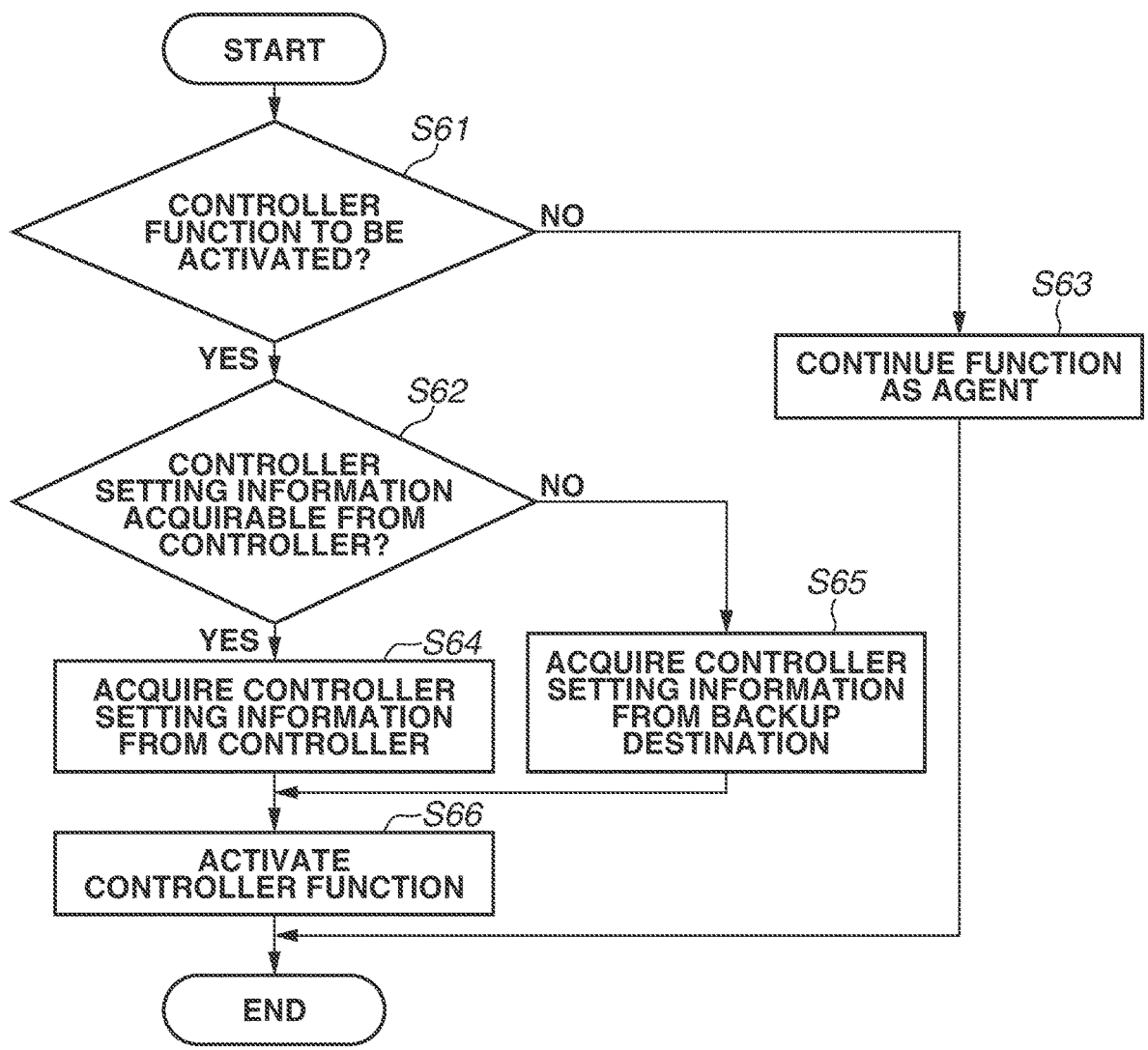
FIG. 6 is a flowchart illustrating an example of processing performed in a case where the communication apparatus 1 according to the first exemplary embodiment operating as an agent of the multi-AP network activates the controller function.

FIGS. 5 and 6 are flowcharts illustrating processing performed in a case where the communication apparatus operates as an agent of the multi-AP network 5. Each step of the flowcharts in FIGS. 5 and 6 may be implemented when the control unit 12 reads a program stored in the storage unit 11 and then executes the program as in FIG. 3. A part of the program may be implemented by hardware.

The following description will be made on the premise that the communication apparatus 2 in FIG. 1 operating as an agent for convenience. The communication apparatus 1 may perform the processing illustrated in FIGS. 5 and 6 as an agent in place of the communication apparatus 2.

FIG. 5 is a flowchart illustrating an example of processing performed in a case where the communication apparatus 2 receives a notification about the location information about the backup destination of the controller setting information.

In step S51, the multi-AP agent unit 122 of the communication apparatus 2 determines whether a notification about the backup destination of the controller setting information is received from the controller. More specifically, the multi-AP agent unit 122 can determine whether a notification about the backup destination of the controller setting information is received from the controller, for example, by determining whether a notification message is received from the controller via the communication unit 16. The notification method is similar in detail to that in step S6 in FIG. 3, and redundant descriptions thereof will be omitted.

When the multi-AP agent unit 122 determines that a notification about the backup destination of the controller setting information is received from the controller (YES in step S51), the processing proceeds to step S52. In step S52, the multi-AP agent unit 122 of the communication apparatus 2 stores the notified location information about the backup destination of the controller setting information in the storage unit 11. On the other hand, when multi-AP agent unit 122 determines that a notification about the backup destination of the controller setting information is not received from the controller (NO in step S51), the multi-AP agent unit 122 ends the processing without receiving a notification about the backup destination from the controller.

FIG. 6 is a flowchart illustrating an example of processing performed in a case where the communication apparatus 2 operating as an agent activates the controller function.

In step S61, the multi-AP agent unit 122 of the communication apparatus 2 determines whether to activate the controller function. More specifically, the determination about whether to activate the controller function can be performed by determining whether an instruction for enabling the role of the controller is received from the user via the input unit 14. However, the instruction subjected to the determination is not limited to an instruction input from the user. The multi-AP agent unit 122 may determine whether an instruction for enabling the role of the controller is received from an operator of a service provider via the communication unit 16. Alternatively, the multi-AP agent unit 122 may determine whether the communication apparatus 2 is selected as a controller by the controller automatic selection algorithm of the multi-AP network 5.

When the multi-AP agent unit 122 determines to activate the controller function (YES in step S61), the processing proceeds to step S62. In step S62, the multi-AP controller unit 121 of the communication apparatus 2 determines whether the controller setting information can be acquired from the current controller. The determination about whether the controller setting information can be acquired from the current controller can be performed by searching for an AP already operating as a controller in the multi-AP network 5 to determine whether there exists a controller already operating.

The controller search processing can be performed, for example, by multicasting the AP-Autoconfiguration Search message prescribed by the IEEE 1905.1 standard based on the specifications of the Wi-Fi EasyMesh standard. If the AP-Autoconfiguration Response message is received as a response to the transmitted AP-Autoconfiguration Search message, the controller can be determined to exist. If the response is not received, the controller search processing may be performed again for a predetermined period or a predetermined number of times. The current controller search method is not limited to the above-described method. An arbitrary protocol or an arbitrary message is also applicable.

On the other hand, when the multi-AP agent unit 122 determines not to activate the controller function (NO in step S61), the processing proceeds to step S63. In step S63, the multi-AP agent unit 122 of the communication apparatus 2 continues the function as an agent and ends the processing in FIG. 6.

When the multi-AP controller unit 121 determines that the controller setting information can be acquired from the current controller (YES in step S62), the processing proceeds to step S64. In step S64, the multi-AP controller unit 121 of the communication apparatus 2 acquires the controller setting information from the current controller. Although the method for acquiring the controller setting information from the current controller can use a predetermined message prescribed by the IEEE 1905.1 standard, the present invention is not limited thereto. An arbitrary protocol or an arbitrary format is also applicable.

The controller setting information acquired in step S64 includes at least one of an SSID, channel setting, a password and certificate required for authentication, agent management information, network topology information, and discovery information. In response to a request for acquiring the controller setting information, the current controller transfers the controller setting information to an AP that will start operating as a new controller in place of the current controller in the multi-AP network 5.

On the other hand, when the multi-AP controller unit 121 determines that the controller setting information cannot be acquired from the current controller (NO in step S62), the processing proceeds to step S65. In step S65, the multi-AP controller unit 121 of the communication apparatus 2 refers to the location information about the backup destination of the controller setting information stored in step S52 in FIG. 5 to acquire the controller setting information from the backup destination.

If the multi-AP controller unit 121 can acquire the controller setting information from neither the current controller nor the backup destination, the multi-AP controller unit 121 may display an error screen indicating that the controller setting information cannot be acquired on the output unit 15. Alternatively, the multi-AP controller unit 121 may display a screen for promoting the input of the controller setting information on the output unit 15 to prompt the user to input the controller setting information via the input unit 14.

In step S66, the control unit 12 of the communication apparatus 2 activates the controller function based on the controller setting information acquired in step S64 or S65, and ends the processing.

In step S66 and subsequent steps, the multi-AP controller unit 121 of the communication apparatus 2 controls the entire multi-AP network 5 as a new controller in place of the previous controller.

At a timing when the function of the multi-AP controller unit 121 is activated, the communication apparatus 2 may update the controller setting information and change the backup destination of the controller setting information.

As described above, the communication apparatus activated as a controller may function as an agent at the same time. In this case, by activating the function of the multi-AP controller unit 121 without disabling (while continuing) the function of the multi-AP agent unit 122, the control unit 12 of the communication apparatus 2 can perform the functions of the controller and the agent at the same time. On the other hand, when the communication apparatus as a controller cannot function as an agent at the same time, the control unit 12 of the communication apparatus 2 disables the function of the multi-AP agent unit 122 to prevent the functions of the controller and the agent from operating at the same time.

As a result of performing the processing of the flowcharts illustrated in FIGS. 5 and 6, the communication apparatus 2 can acquire the controller setting information from the backup destination even if the communication apparatus 2 cannot acquire the controller setting information from the current controller in the multi-AP network 5. Thus, even if the current controller deactivates its role, the communication apparatus 2 can enable the controller function of the self apparatus.

<Control Sequence of Entire Communication System in Multi-AP Network>

Figure 7:
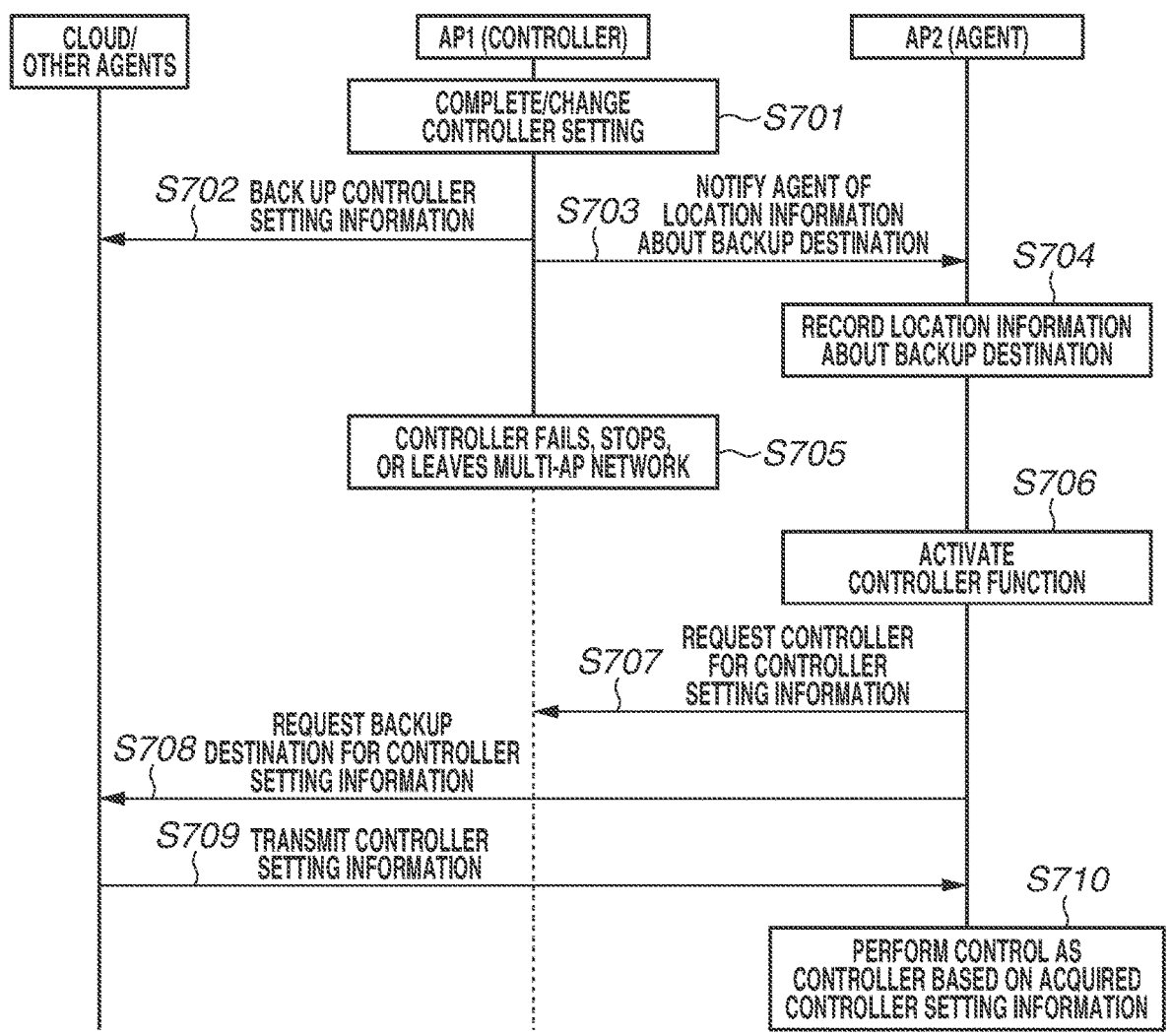
FIG. 7 is a sequence diagram illustrating an example of a processing sequence between communication apparatuses in the communication system according to the first exemplary embodiment.

FIG. 7 illustrates an example of a control sequence between communication apparatuses when the controller notifies an agent participating in the multi-AP network 5 of the location information about the backup destination of the controller setting information.

Referring to FIG. 7, the sequence is preset so that the AP 1 functions as a controller and the AP 2 functions as an agent. When an AP is activated as a controller or an agent, the AP activates predetermined functions based on the specifications of the Wi-Fi EasyMesh standard.

More specifically, for example, when the AP is activated as an agent, the AP activates the STA function of the multi-AP device called a Backhaul STA and starts processing for participating in the multi-AP network 5 in order to participate in the multi-AP network 5. On the other hand, when the AP is activated as a controller, the AP activates the AP function of the multi-AP device called a Fronthaul AP and waits for connection from other STA apparatuses and a Backhaul STA activated by other APs.

In step S701, the AP 1 that has been activated as a controller sets the controller setting information to the self apparatus or changes the controller setting information that has already been set.

In step S702, the AP 1 backs up the controller setting information upon completion or change of the controller setting in step S701. When the AP 1 serves as a gateway as illustrated in FIG. 1, the backup destination may be any one of other agents or storage devices in the multi-AP network 5. On the other hand, when the AP 1 does not serve as a gateway, the backup destination may be a cloud outside the multi-AP network 5 or any one of other agents and storage devices in the multi-AP network 5.

In step S703, the AP 1 notifies the AP 2 of the location information about the backup destination of the controller setting information. The AP 1 can notify the AP 2 of the location information about the backup destination of the controller setting information by transmitting a predetermined message as an expanded form of a control message conforming to the IEEE 1905.1 standard to include the TLV format 40 illustrated in FIG. 4.

In the above-described example, only one agent exists. If a plurality of agents exists, the AP 1 may notify the plurality of agents of the location information about the backup destination of the controller setting information.

In step S704, upon reception of the notification of the location information about the backup destination of the controller setting information from the AP 1, the AP 2 stores the location information about the backup destination of the controller setting information notified in step S703 in the storage unit 11.

If the AP 1 functioning as a controller fails, stops, or leaves the multi-AP network 5 in step S705, then in step S706, the AP 2 activates the controller function.

The AP 2 may activate the controller function at other timings. For example, if the user detects the degradation of the overall performance of the multi-AP network 5, the user may activate the controller function of the AP 2 with a manual operation. Further, if the AP 2 detects that the AP 1 as a controller does not exist in the multi-AP network 5, the AP 2 may automatically activate the controller function. However, the method for activating the controller function is not limited thereto. For example, the AP 2 may activate the controller function if the AP 2 is selected as a new controller through an automatic controller selection algorithm of the multi-AP network 5.

The failure of the controller in step S705 is not limited to a hardware failure. Examples of controller failures may include a firmware update failure with which the AP1 can no longer function as a controller. When the AP 1 serves as both a controller and an agent at the same time, the AP 1 can continue the function of the agent even if the controller function is deactivated.

In step S707, the AP 2 that will function as a new controller firstly requests the AP 1 as the current controller for the controller setting information. The AP 2 can acquire the controller setting information from the AP 1 as long as the AP 1 is not defective. However, since the AP 1 fails, stops, or leaves the multi-AP network 5 in step S705 in FIG. 7, the AP 2 cannot acquire a response to the request for the controller setting information. More specifically, the AP 2 cannot directly acquire the controller setting information from the AP 1.

Therefore, in step S708, the AP 2 refers to the location information about the backup destination of the controller setting information prestored in step S704 and requests the backup destination of the controller setting information for the controller setting information.

In step S709, the AP 2 acquires the controller setting information to be set in the AP 2 from the backup destination of the controller setting information. In step S710, the AP 2 performs various kinds of control as a controller based on the acquired controller setting information.

If the AP 2 detects that the AP 1 as the current controller fails, stops, or leaves the multi-AP network 5 before requesting the AP 1 for the controller setting information in step S707, the processing may skip step S707, i.e., the AP 2 does not need to request the AP 1 for the controller setting information.

As discussed above, according to the present exemplary embodiment, a communication apparatus operating as a controller backs up to other storage devices the controller setting information set in the self apparatus to operate as a controller on the multi-AP network (on a wireless network). The communication apparatus operating as a controller notifies other agents participating in the multi-AP network of the location information about the backup destination of the controller setting information.

A communication apparatus operating as an agent stores the location information about the backup destination of the controller setting information notified from the controller. When the communication apparatus operating as an agent is activated as a controller, the communication apparatus refers to the location information about the backup destination and accesses the backup destination identified based on the location information to acquire the controller setting information.

This enables the new controller to simply and reliably take over the controller setting information in the multi-AP network. The user does not need to perform the controller setting on the AP that will serve as a new controller, reducing the complexity of user operations related to the controller setting.

Second Exemplary Embodiment

A second exemplary embodiment will be described in detail below with reference to FIGS. 8 to 10 centering only on differences from the first exemplary embodiment.

According to the first exemplary embodiment, the controller notifies other agents having participated in the multi-AP network 5 of the location information about the backup destination of the controller setting information. According to the present exemplary embodiment, on the other hand, the controller notifies the agent attempting to participate in the multi-AP network 5 of the location information about the backup destination of the controller setting information.

The hardware and function configuration of the communication apparatus according to the second exemplary embodiment is similar to that of the communication apparatus according to the first exemplary embodiment having been described above with reference to FIG. 2, and redundant descriptions thereof will be omitted.

Figure 8:
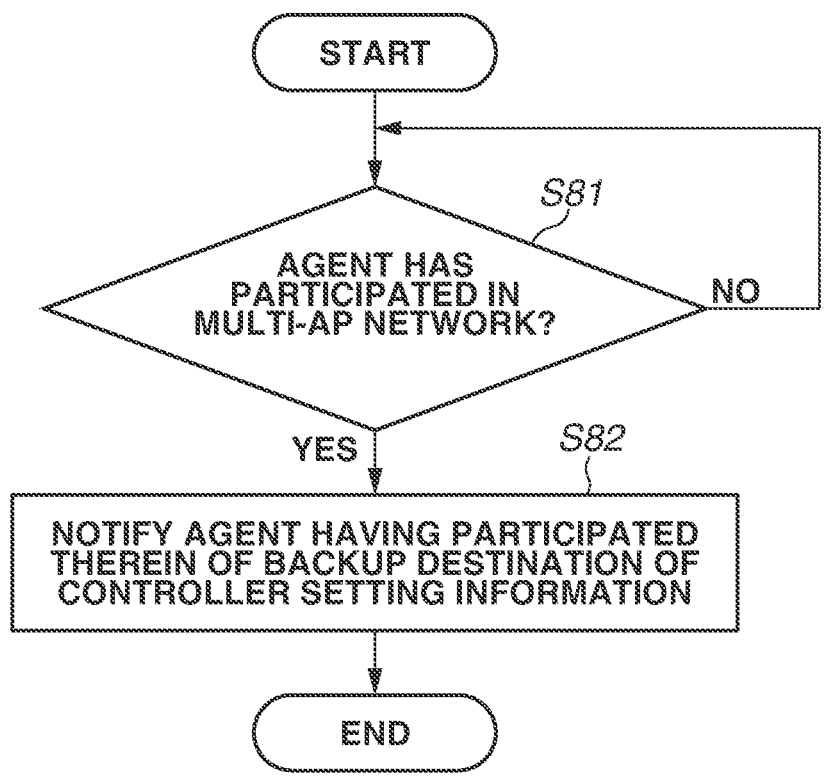
FIG. 8 is a flowchart illustrating an example of processing performed in a case where a communication apparatus according to a second exemplary embodiment operates as a controller of the multi-AP network.

FIG. 8 is a flowchart illustrating an example of processing performed in a case where the communication apparatus 1 according to the second exemplary embodiment operates as a controller of the multi-AP network 5.

In step S81, the multi-AP controller unit 121 of the communication apparatus 1 determines whether a new agent has participated in the multi-AP network 5. The determination about whether a new agent has participated in the multi-AP network 5 can be performed by determining whether a controller search message transmitted by the agent when participating in the multi-AP network 5 is received. The controller search method is similar in detail to that according to the first exemplary embodiment described in step S62 in FIG. 6, and redundant descriptions thereof will be omitted.

When the multi-AP controller unit 121 determines that a new agent has not participated in the multi-AP network 5

(NO in step S81), the processing returns to step S81. The multi-AP controller unit 121 of the communication apparatus 1 repeats the processing for determining whether a new agent has participated in the multi-AP network 5. The determination in step S81 may be ended when a predetermined time period has elapsed, or repeated until an agent is determined to have participated in the multi-AP network 5.

On the other hand, when the multi-AP controller unit 121 determines that a new agent has participated in the multi-AP network 5 (YES in step S81), the processing proceeds to S82.

In step S82, the multi-AP controller unit 121 of the communication apparatus 1 notifies the agent having participated in the multi-AP network 5 of the location information about the backup destination of the controller setting information.

The method for notifying the agent of the location information about the backup destination in step S82 may use the AP-Autoconfiguration Search/Response message used in the controller search described in step S62 in FIG. 6.

More specifically, the controller may transmit the AP-Autoconfiguration Response message in response to the AP-Autoconfiguration Search message received from the agent. In this case, the controller may transmit a control message as an expanded form of this response message to include the TLV format indicating the location information about the backup destination of the controller setting information illustrated in FIG. 4. Alternatively, the controller may notify the agent of the location information about the backup destination via an arbitrary multi-AP control message. The method for notifying the agent of the location information about the backup destination of the controller setting information is not limited to the above-descried methods and protocols.

As a result of performing the processing of the flowchart illustrated in FIG. 8, when the communication apparatus 1 operates as a controller, the controller can notify the new agent having participated in the multi-AP network 5 of the location information about the backup destination of the controller setting information.

Figure 9:
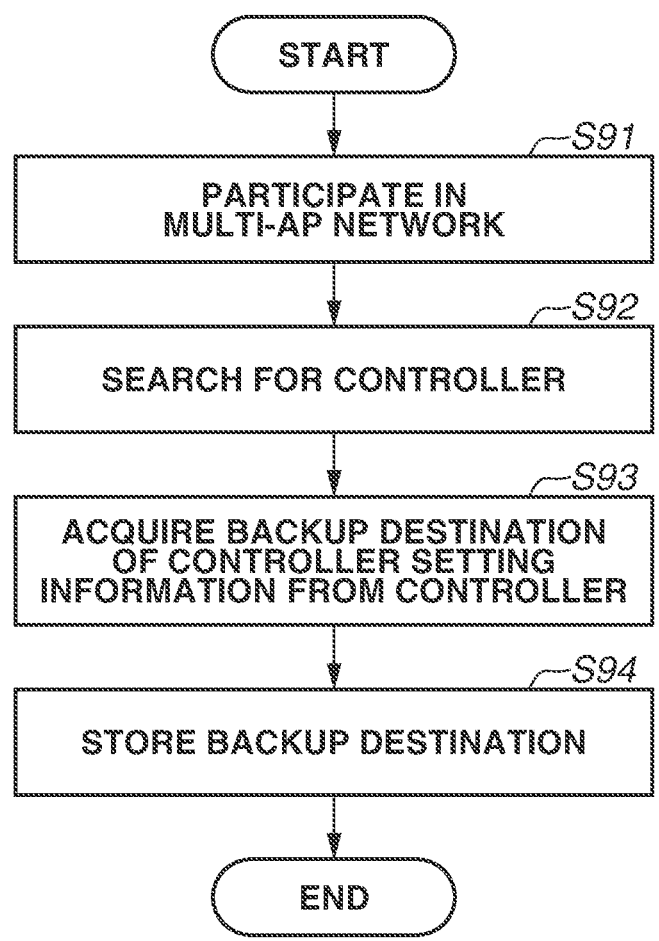
FIG. 9 is a flowchart illustrating an example of processing performed in a case where a communication apparatus according to the second exemplary embodiment operates as an agent of the multi-AP network.

FIG. 9 is a flowchart illustrating an example of processing performed in a case where the communication apparatus 2 according to the second exemplary embodiment operates as an agent of the multi-AP network 5.

In step S91, the multi-AP agent unit 122 of the communication apparatus 2 participates in the multi-AP network 5, for example, in response to an instruction from the user via the input unit 14. The method for participating in the multi-AP network 5 can use Wi-Fi Protected Setup (WPS) or Device Provisioning Protocol (DPP) conforming to the Wi-Fi EasyMesh specifications. The WPS and DPP standards formulated by Wi-Fi Alliance facilitate setting of communication parameters required for wireless LAN connection, such as an SSID and an encryption key, to a communication apparatus. The method for participating in the multi-AP network 5 is not limited to the above-described methods and protocols.

In step S92, the multi-AP agent unit 122 of the communication apparatus 2 searches for the controller of the multi-AP network 5. The controller search method is similar in detail to that according to the first exemplary embodiment described in step S62 in FIG. 6, and redundant descriptions thereof will be omitted.

In step S93, the multi-AP agent unit 122 of the communication apparatus 2 acquires the location information about the backup destination of the controller setting information from the controller found as a result of the controller search.

In step S94, the multi-AP agent unit 122 of the communication apparatus 2 stores the acquired location information about the backup destination of the controller setting information in the storage unit 11.

For example, the multi-AP agent unit 122 needs to acquire the location information about the backup destination of the controller setting information from the search response message (AP-Autoconfiguration Response) received from the controller in the controller search in step S92, and store the acquired location information in the storage unit 11. Alternatively, the multi-AP agent unit 122 may transmit a message for requesting for the location information about the backup destination of the controller setting information, to the controller found as a result of the search in step S92, and acquire the location information from the response.

The processing when the communication apparatus 2 operating as an agent acquires the location information about the backup destination of the controller setting information from the controller and then activates the controller function is similar to that in steps S61 to S66 in FIG. 6 according to the first exemplary embodiment, and redundant descriptions thereof will be omitted.

As a result of performing the processing of the flowchart illustrated in FIG. 9, when the communication apparatus 2 operates as an agent, the multi-AP agent unit 122 can acquire the location information about the backup destination of the controller setting information from the controller at the timing when the communication apparatus 2 participates in the multi-AP network 5.

Figure 10:
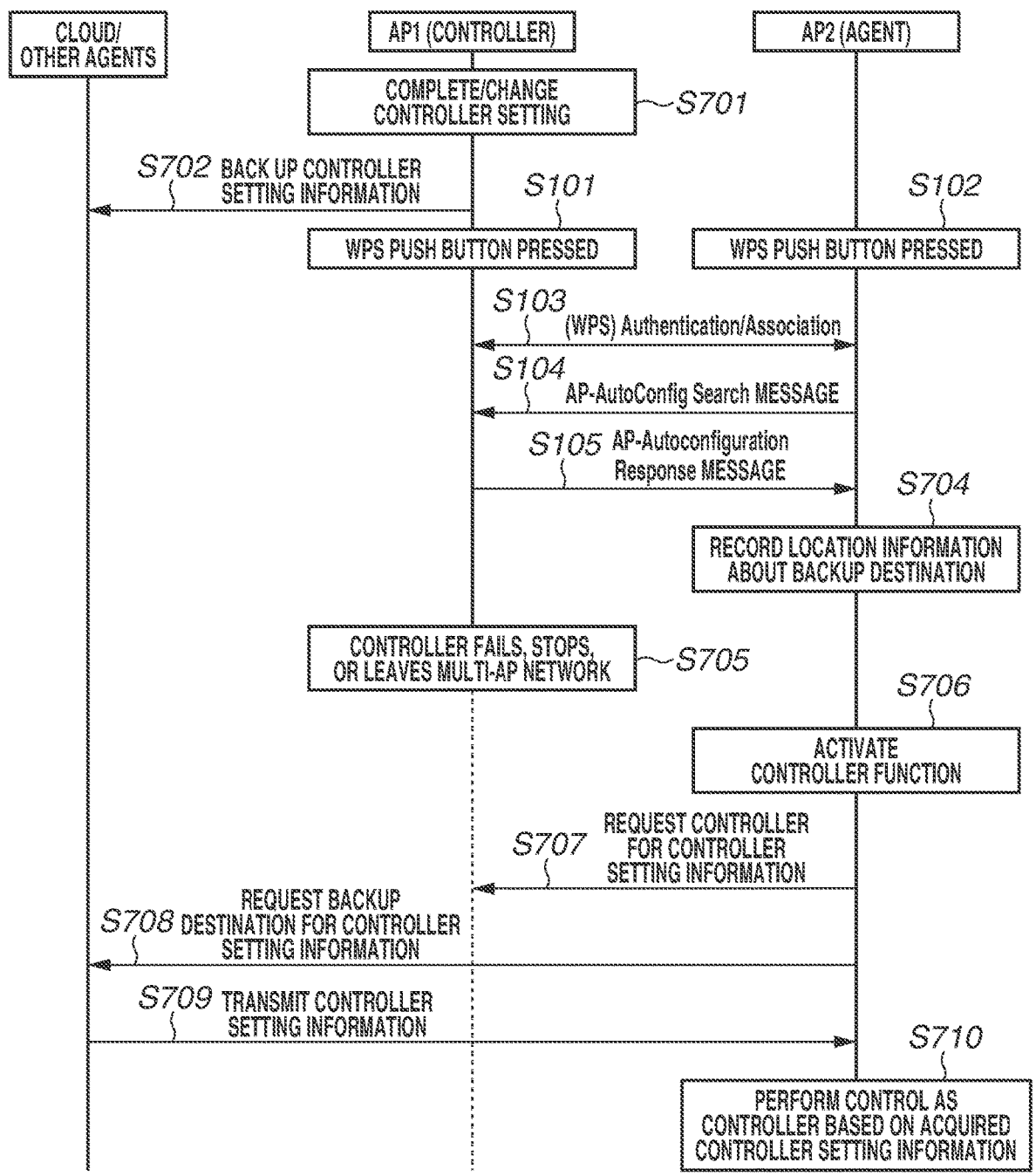
FIG. 10 is a sequence diagram illustrating an example of a processing sequence between communication apparatuses in a communication system according to the second exemplary embodiment.

FIG. 10 illustrates an example of a control sequence between communication apparatuses when the controller notifies the new agent participating in the multi-AP network 5 of the location information about the backup destination of the controller setting information according to the present exemplary embodiment.

Referring to FIG. 10, the sequence is preset so that the AP 1 functions as a controller and the AP 2 functions as an agent, like the sequence in FIG. 7.

Referring to FIG. 10, the processing in steps S701 and S702 is similar to the processing in steps S701 and S702 illustrated in FIG. 7, respectively, and redundant descriptions thereof will be omitted.

In steps S101 and S102, when the users press the WPS push buttons of the AP 1 and AP 2, for example, the AP 2 operating as an agent starts participating in the multi-AP network 5 in synchronization with the AP 1 operating as a controller.

In steps S103 to S105, the AP 1 and AP 2 start the sequence for participating in the multi-AP network at the timing when the WPS push buttons are pressed.

More specifically, in step S103, the AP 1 and AP 2 transmit and receive wireless frames such as WPS Authentication and WPS Association conforming to the specifications of the Wi-Fi EasyMesh standard.

In step S104, the AP 2 as an agent transmits the AP-Autoconfiguration Search message for the controller search to the AP 1 as a controller.

In step S105, in response to the AP-Autoconfiguration Search message, the AP 1 as a controller transmits the AP-Autoconfiguration Response message to the AP 2 as an agent. The AP-Autoconfiguration Response message transmitted from the AP 1 to the AP 2 is a control message expanded to include the TLV format for describing the location information about the backup destination in FIG. 4.

In step S704, the AP 2 refers to the AP-Autoconfiguration Response message received from the AP 1 to acquire the location information about the backup destination of the controller setting information, and stores the acquired location information in the storage unit 11.

The sequence in steps S705 to S710 after storing the location information about the backup destination is similar in detail to that according to the first exemplary embodiment described above with reference to steps S705 to S710 in FIG. 7, and redundant descriptions thereof will be omitted.

As discussed above, according to the present exemplary embodiment, when a communication apparatus operating as an agent participates in the multi-AP network, the multi-AP agent unit 122 acquires the location information about the backup destination of the controller setting information included in the search response message received from the controller. Thus, even when a new agent participates in the multi-AP network and the network topology changes, the controller can simply and reliably transfer the controller setting information in the multi-AP network.

Modifications

Although, in the above-described exemplary embodiments, a cloud and other agents are described as a backup destination of the controller setting information, the backup destination of the controller setting information is not limited thereto. For example, as long as the communication apparatus to be a new controller in place of the current controller is accessible, the communication apparatus operating as a controller may use an apparatus having a storage device, other than a cloud and other agents, as a backup destination. The backup destination may be configured to be settable by the user.

Other Exemplary Embodiments

The present invention can be embodied as, for example, a system, an apparatus, a method, a program, or a recording medium (storage medium). More specifically, the present invention is applicable to a system composed of a plurality of apparatuses (for example, a host computer, an interface device, an imaging apparatus, a web application, etc.) or to an apparatus composed of one device.

The present invention can also be achieved by a program that implements some or at least one of the functions of the above-described exemplary embodiments. More specifically, the present invention can also be achieved when the program is supplied to a system or apparatus via a network or storage medium, and at least one processor in a computer (or CPU or micro processing unit (MPU)) of the system or apparatus reads and executes the program. The program may be provided in a form recorded in a computer-readable recording medium.

The present invention is not limited to a form where the functions of the exemplary embodiments are implemented when the computer executes the read program. For example, an operating system (OS) operating on the computer may perform part or the whole of actual processing based on instructions of the program, and the functions of the above-described exemplary embodiments may be implemented by the processing.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention makes it possible to enhance convenience in transferring the setting information for enabling operation as an access point that controls another access point, to the another access point in a wireless network including a plurality of access points.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   at least one memory that stores a set of instructions; and
   at least one processor that executes the instructions, the instructions, when executed causing the communication apparatus to perform operations comprising:
   setting, based on a user operation, operation setting information for operating an access point having a controller role configured to control a network including a plurality of access points,
   executing backup processing to store a backup of the operation setting information into any one another access point among the plurality of access points in accordance with setting made on the operation setting information, and
   performing a notification, via the network controlled by the communication apparatus as the access point having the controller role, to at least one another access point among the plurality of access points, of a message including access information for accessing the backup of the operation setting information backed up to the other access point, after execution of the backup processing, wherein the access information is expressed by any of a Universal Resource Locator (URL), an Internet Protocol (IP) address, and a Media Access Control (MAC) address.

2. The communication apparatus according to claim 1, wherein the network conforms to a Wi-Fi EasyMesh standard, the access point of the controller role is a controller of the Wi-Fi EashMesh, and the other access point is an agent of the Wi-Fi EasyMesh.

3. The communication apparatus according to claim 1, wherein the message including the access information is an AP-Autoconfiguration Response message prescribed by an Institute of Electrical and Electronics Engineers (IEEE) 1905.1 standard or an arbitrary multi-AP control message.

4. A method for controlling a communication apparatus, the method comprising:
   setting, based on a user operation, operation setting information for operating as an access point having a controller role configured to control a network including a plurality of access points,
   executing backup processing to store a backup of the operation setting information into any one another access point among the plurality of access points in accordance with setting made on the operation setting information, and
   performing a notification, via the network controller by the communication apparatus as the access point having the controller role, to at least one another access point among the plurality of access points, of a message including access information for accessing the backup of the operating setting information backed up to the other access point after execution of the backup processing, wherein the access information is expressed by any of a Universal Resource Locator (URL), and Internet Protocol (IP) address, and a Media Access Control (MAC) address.

5. A non-transitory computer-readable storage medium storing a program for causing a processor to execute a method of controlling a communication apparatus, the method comprising:
   setting, based on a user operation, operation setting information for operating as an access point having a controller role configured to control a network including a plurality of access points,
   executing backup processing to store a backup of the operation setting information into any one another access point among the plurality of access points in accordance with setting made on the operation setting information, and
   performing a notification, via the network controller by the communication apparatus as the access point having the controller role, to at least one another access point among the plurality of access points, of a message including access information for accessing the backup of the operating setting information backed up to the other access point after execution of the backup processing, wherein the access information is expressed by any of a Universal Resource Locator (URL), and Internet Protocol (IP) address, and a Media Access Control (MAC) address.

* * * * *